Oct. 18, 1955    H. H. HOKE, JR    2,720,856
SUBMARINE POWER PLANT
Filed Sept. 17, 1951    2 Sheets-Sheet 1
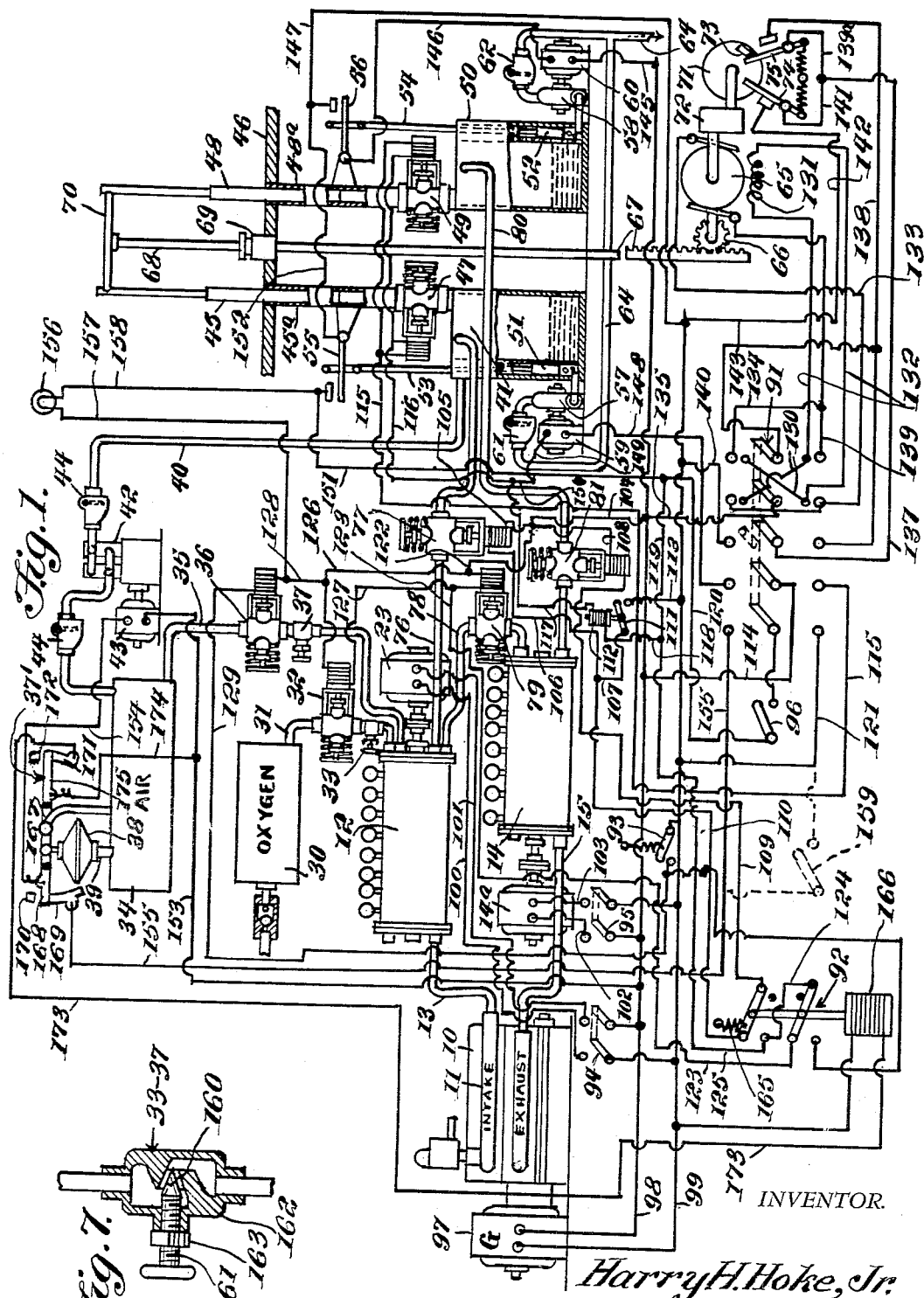
INVENTOR.
Harry H. Hoke, Jr.
BY Francis G. Boswell ATTORNEY Oct. 18, 1955
H. H. HOKE, JR
2,720,856
SUBMARINE POWER PLANT
Filed Sept. 17, 1951
2 Sheets—Sheet 2
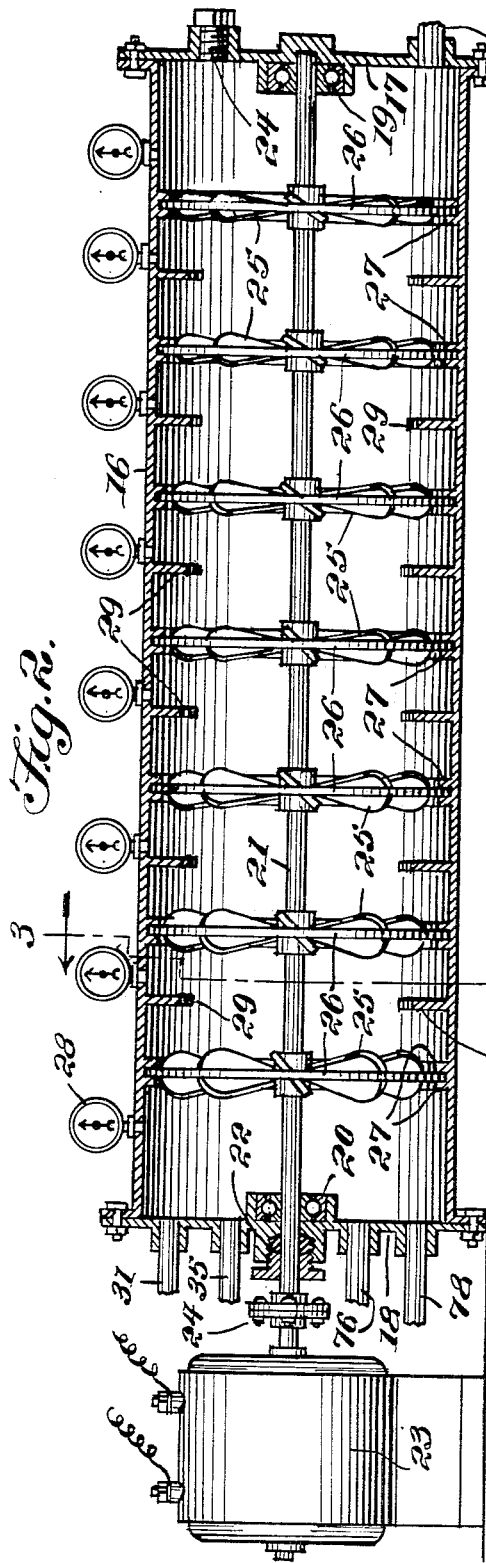
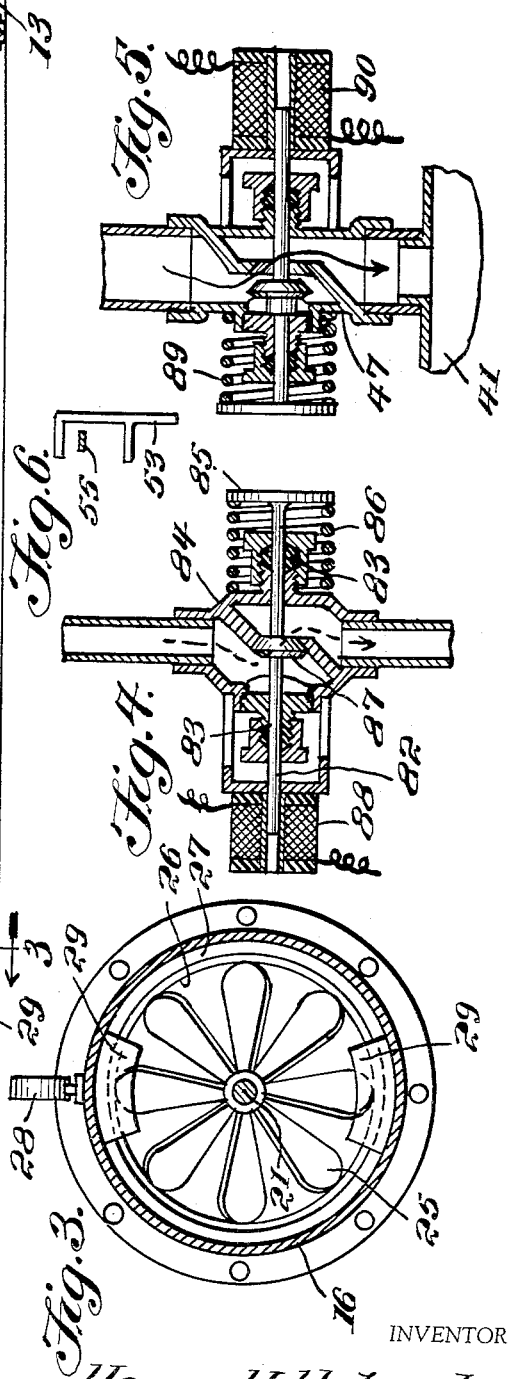
INVENTOR
*Harry H. Hoke, Jr.*
BY *Francis G. Boswell*
ATTORNEY

United States Patent Office 2,720,856
Patented Oct. 18, 1955

2,720,856

SUBMARINE POWER PLANT

Harry H. Hoke, Jr., Washington, D. C.

Application September 17, 1951, Serial No. 247,008

12 Claims. (Cl. 114—16)

The object of the invention is to provide a power plant for a submarine so that the same may be employed for driving purposes when the submarine is submerged where the snorkel tubes cannot be used, or where the submarine is cruising near the surface of the water with the snorkel tubes exposed in the dip of a wave but submerged in the crest thereof; to provide a power plant in which, when air is not available, the exhaust of the engine is re-oxygenized and used in place of fresh air; to provide a power plant construction for the purpose indicated, in which, when the snorkel tube is but slightly above the water, such air as will pass therethrough when not used in the engine will be stored in a pressure tank for subsequent use; to provide a plant construction in which the exhaust and oxygen are intimately mixed before introduction into the engine intake; to provide snorkel tube elevating and lowering means and coordinated valve actuating means whereby the expedient of elevating the snorkel tube will render the plant operative selectively on oxygen mixed with the exhaust or directly on atmospheric air; and generally to provide a plant of this character which is entirely automatic to the extent that its functions are so carried out and do not rely upon the human element except to initiate and terminate the operation.

With this object in view, the invention consists in a construction and combination of parts in which a preferred embodiment is illustrated in the accompanying drawings, wherein:

Figure 1 is a diagrammatic view of the improved plant;

Figure 2 is a diametrical longitudinal sectional view of the injector or ejector, depending on the function to be carried out;

Figure 3 is a sectional view on the plane indicated by the line 3—3 of Figure 2;

Figure 4 is a sectional view through the normally closed valve used in the equipment;

Figure 5 is a similar view of the normally open valve used in such equipment;

Figure 6 is a detail view of the switch actuating float rod; and

Figure 7 is a sectional view of the metering valve.

Designed to function as a driving means for the submarine whether under water or on the surface thereof, the engine 10 is so equipped that it may receive direct atmospheric air in the intake 11, or a mixture of oxygen and the exhaust gases. To this end, there is provided an injector 12 whose discharge end is connected to the intake of the engine by a tubular conductor 13, the exhaust being connected to the intake of an ejector 14 by means of a conductor 15. The injector and ejector are identical in construction but, when used on both the intake and exhaust, are reversely positioned as clearly shown in Figure 1. Each comprises a drum or cylinder 16 with removable heads 17 and 18 formed with bearings 19 and 20 for a shaft 21. At the bearing 19, the head is closed but at the head 18, a packing box 22 is incorporated in the bearing and through this the shaft passes to be coupled to the shaft of a motor 23 through the medium of connected flanges 24.

The head 18 is made with a plurality of outlets so that when used as an injector, the air intake, oxygen intake, compressed air intake and exhaust may be admitted to the cylinder. When used as an ejector, only one opening is necessary in the intake end and the others are accordingly closed with plugs. Similarly, the head 17 is made with dual outlets of which one is closed by a removable plug 24 when not in use and the other has inserted therein the end of the conductor 13.

The shaft 21 carries a series of fans 25 uniformly spaced along the shaft, each being provided with a peripheral rim 26 which is positioned between pairs of peripheral flanges 27, uniformly spaced along the interior of the cylinder. These fans thus divide the cylinder into a plurality of chambers, the pressure in each of which is indicated by a gauge 28. The pitch of the fan blades varies, being greatest at the intake end and progressively reduced in pitch towards the discharge end. Thus, the greatest pull is at the intake end and it tapers off towards the discharge end so as to provide an increased pressure at the time of admission into the intake manifold. The function of the injector is to thoroughly mix the exhaust gases and oxygen so as to have an appropriate medium for the support of the fuel when ignited. To aid in this, the cylinder interiorly is provided with baffles 29, there being two, diametrically disposed, in each pressure chamber as defined by the fans. The oxygen tank 30 is connected to the intake end of the injector 12 with a tubular conductor 31 in which is interposed an electrically operated valve 32 and a metering valve 33. Likewise the compressed air tank 34 is connected to the intake end of the injector by a tubular conductor 35 in which is interposed a similarly electrically operated valve 36 as well as a metering valve 37. The air tank is equipped with a pressure operated switch 37' actuated by a chambered member 38 composed of connected diaphragms of which one has a pivotal connection with the switch lever and the other a tubular connection 39 with the air tank. When subjected to pressure, the diaphragms expand and raise the switch lever but when the pressure is reduced, the diaphragms contract until the switch member is brought into circuit closing position with its associated contact. The air tank is fed through a conductor 40 connected with the trap tank 41 and in it is interposed an air pump 42 driven by a motor 43, check valves 44 being disposed on opposite sides of the pump.

The switch 37' controls the operation of the motor 43 driving pump 42.

The trap tank 41 is an element of the intake snorkel tube 45 which is of telescopic form as shown, the outermost section 45a having its upper end flush with the deck 46 and being sealed where it opens on the deck. An electrically actuated valve 47 is interposed in the section 45a between the deck and the trap tank 41. The exhaust snorkel tube 48 is of identical form with the intake snorkel tube, the section 48a being similarly mounted and provided with a valve 49 between the deck 46 and the trap tank 50. Within the trap tanks are floats 51 and 52 having float rods 53 and 54 passing slidingly through the tops of the tanks, both tanks being closed containers. The float rods function to actuate switches, that indicated at 55 being the switch for the tank 41 and that at 56 being the switch for the tank 50. The switches, in Figure 1, are graphically shown but are intended to be of the toggle type so that, when the float rod rises the switch will be moved to closed position and when it drops, the switch will be moved to open position.

Since the apparatus is designed to operate when the ship is low enough so that the snorkel tubes, when extended, will have their upper ends below the level of the wave crests but above the level of the dips in the waves, a certain amount of water will flow into the snorkel tubes and this is caught in the trap tanks and removed therefrom by pumps 57 and 58 driven by motors 59 and 60 respectively and discharging through check valves 61 and 62 into a discharge header 63 which discharges to the exterior of the vessel as indicated at 64.

The snorkel tubes may be elevated and lowered by air pressure, hydraulic means, or other means, such as an electric motor, as shown at 65. While indicated as a conventional shunt motor, the motor may be single or plural phase alternating. It is essential, however, that it be reversing so as to accomplish both the raising and lowering functions. To this end, it is equipped with a gear 66 meshing with a rack 67 which is an element of the snorkel actuating rod 68, the latter passing through a packing box 69 in the deck 46 and being terminally connected to a cross-head 70 which is joined to the upper ends of the innermost sections of both snorkel tubes. Rotating in one direction, the motor pulls the tubes down until the cross-head abuts the packing box when the tube sections are telescoped one within the other. Rotating in the other direction, the tubes are obviously extended. To provide for the automatic stopping of the motor, it actuates a switch trip-disc 71, motion being communicated to the latter from the motor through a gear reduction housed in the case 72. On its face, the disc carries a lug 73 which abuts the switch lever 74 or the switch lever 75, depending on the direction of rotation. When rotating to elevate the snorkel tubes, the lug engages the switch lever 74 when the tubes are fully elevated and thus stops the operation of the motor. When rotating to lower the tubes, the lug effects engagement with the lever 75 and thus stops rotation of the motor when moving in that direction.

The intake end of the injector is connected with the trap tank 41 through a conductor 76, a valve 77 being interposed therein. The injector is also connected with the ejector, a tubular conductor 78 connecting the intake end of the former with the output end of the latter, a valve 79 being interposed in this conductor.

The trap tank 50 is connected with the output end of the ejector 14 by a tubular conductor 80 in which a valve 81 is interposed.

The valves 32, 36, 77, 79, and 81 are of identical construction and they are built as indicated in the sectional view shown in Figure 4. Being of the disc type, the valve stem 82 extends through packing boxes 83 on opposite sides of the case 84, one end of the stem being provided with a head 85 between which and the case is interposed a compression spring 86 which, expanded, keeps the disc 87 on its seat and normally retains the valve yieldingly in closed position. A solenoid 88 is mounted at the opposite end of the case from the spring 86 and receives the end of the stem 82. When energized, it effects a pull on the stem and thus shifts the valve to open position against the pressure of the spring and retains it in such position as long as the solenoid is energized. The valves 47 and 49, while similar to the other valves, are constructed to normally assume open position, the spring 89 functioning to pull the valved disc away from its seat and the solenoid 90, when energized, functioning to pull the disc onto its seat.

Coordination of operation between the motor and the various valves is effected in the main through the instrumentality of a quintuple-pole double-throw switch 91.

For selective use in the intake of the engine of air from the air tank 34 or oxygen from the tank 30, a double-pole double-throw switch 92 is provided, other switches, such as those indicated at 93, 94, 95 and 96 being a part of the equipment to function as hereinafter appearing.

Electrical means lends itself best to accomplishing the desired coordinated functions of the apparatus and to this end an energizing generator 97 is employed, being driven from the engine 10 and feeding conductors 98 and 99 from which various circuits are fed. Of course, when the engine is set in operation, the generator 97 is likewise set in operation and it is necessary to energize the motors 23 and 14a driving the movable elements of the injector and ejector respectively. Closing the switch 94 results in energizing the motor 23, current flowing from the conductors 98 and 99 to the motor over conductors 100 and 101. Similarly, closing the switch 95 energizes the motor 14a over the conductors 102 and 103.

Assuming the submarine to be on the surface of the water, there will then be no occasion for using an oxygenized exhaust and the snorkel tubes will be retracted. However, air can pass through them into the trap tanks 41 and 50. But this air must be conducted to the injector 12 for transfer to the motor intake and the exhaust must be conducted from the ejector to the trap tank 50. This arrangement calls for the valves 81, 77, 47, and 49, being open and the remaining valves closed. Since the valves 47 and 49 are normally open valves, the solenoids thereof must be de-energized but the solenoids of the valves 79 and 81 must be energized, although the solenoids of the remaining valves should be de-energized. This condition calls for the quintipule-poled switch being in the lowered position, since the circuit is arranged for that being lowered when the snorkel tubes are lowered and raised when the snorkel tubes are raised. This condition also calls for the switch 92 being in the raised position. With the specified relations of the parts, current will flow from the conductor 98 over the conductor 104, the conductor 105, the solenoid of the valve 77, the conductor 106 to the point where it joins the conductor 107. Another division of this same current passes over the conductor 108 through the solenoid of the valve 81, thence over the conductor 109 to one blade of the switch 92, thence over the conductor 110, where both divisions of the current flow over the conductor 107, the armature 111 which is then in circuit closing position because of the fact that the magnet 112 is de-energized, thence over the conductor 113 to the conductor 99 and back to the generator. Thus, it will be seen that the tubular conductors from the trap tank 41 to the injector and the trap tank 50 to the ejector are open, so that air may be taken in through the snorkel tubes, even though lowered, and passed to the engine through the injector and the exhaust charge discharged through the exhaust snorkel.

Let it be assumed now that circumstances make a quick dive necessary. In such a case, no adjustment of the tubes is necessary, since, when fully submerged, the tubes must be retracted anyway. In such a case, however, water must be excluded from the trap tanks which can be effected by closing the valves 47 and 49. In such a case, the switch 96 must be closed, its normal position when the craft is above water being open. Upon closing this switch, current will flow from the conductor 98 over the conductor 114 to the second blade of the switch 91, thence over that to the conductor 115 to the solenoids of the valves 47 and 49, thence over the conductor 116, the conductor 117, through the magnet 112, the conductor 118, the conductor 119, the conductor 120, the switch 96, the first blade of the switch 91 and the conductor 121 back to the conductor 99 and thence to the generator. On energizing the magnet 112, the armature 111 will be elevated and thus the circuit on the solenoids of the valves 77 and 81 will be open and the springs will move these valves to closed position, thus shutting off communication between the trap tanks and the injector and ejector respectively. But the valves 79 and 32 will be open, energizing current flowing from the conductor 98 over the conductor 104, the conductor 122, one division of the current flowing through the solenoid of the valve 79, thence over the conductor 123 to the right hand blade of the switch 92, thence over the cross-connector 124, the conductor 125, the conductor 119, the conductor 120, the switch 96, the first blade of the quintuple pole switch and the conductor 121 back to the conductor 99 and the generator. The energizing current for the solenoid of the valve 32 flows from the conductor 122 over the conductor 126, through the solenoid of the valve 32 and over the conductor 127, back to the conductor 123 and thence over the same path as the other segment of current. Thus the valves 47 and 49 will be closed to exclude water, the pump switches 55 and 56 will remain inactive since no water entered the trap tanks and all other valves will be closed except the valves 32 and 79, when the engine 10 will be fed from the oxygen tank and ejector through the injector.

If, when operating under these conditions, the gauges on the injector should show that air is needed to increase effectiveness of operation, it may be admitted intermittently from the air tank 34 upon depressing the valve 93 which is normally spring-held to open position and must be pressed and held in closed position. In such case, current will flow from the conductor 98, over the conductor 104, the conductor 122, the conductor 126, the conductor 128 to the solenoid of the valve 36, thence over the conductor 129 and over the switch 93 to the conductor 99 and back to the generator. As long as the switch 93 is closed, the injector intake will be augmented by air from the air tank. By reason of the construction of the switch, it may be admitted intermittently by intermittent pushes on the switch.

The conditions have been assumed where the equipped ship was travelling on the surface of the water and where it was completely submerged. Now take the conditions in which it is sailing merely below the water so that the snorkel tubes will be used. The present construction contemplates a level where the top of the snorkel tubes will be between the crest and dip of the waves. Thus in some instances water will flow in the tubes and in other instances they will be free for the ingress of air and the egress of the exhaust. In the first conditions assumed, the snorkel tubes were completely retracted but under the condition now being described they must be elevated. The previous conditions assumed the switch 91 to be in the lowermost position and that effected operation of the motor so as to retract the tubes. In Figure 1, however, the tubes are shown extended and the operation of the motor has been stopped by the lug 73 engaging and opening the switch 75. When the tubes were retracted, the lug had engaged and opened switch 74, but that was when the switch 91 was in its lowered position. The elevation of the tubes follows the raising of the switch 91, so that its five blades engage the upper contacts. The motor 65 is controlled by the fourth and fifth blades of the switch and this section of the latter has supplemental contacts cross-connected as indicated at 130 and the field 131 is connected across these contacts by the conductors 132. The uppermost and lowermost contacts of this section of the switch control the armature and corresponding contacts are connected by conductors 134 and from one set of these contacts a conductor 133 leads to one brush of the motor while the other set of contacts is connected to the opposite motor brush by a conductor 139.

The switches 74 and 75 have their blades serially connected as at 141—139a and a conductor 137 connects the third blade of the switch 91 with a point between these two switches, the contact terminal of one of which is connected by a conductor 142 to the conductor 99 constituting the negative side of the generator, the corresponding terminal of switch 75 being connected by conductor 138 to the lower contact of the third blade of switch 91 as well as to the fifth blade thereof.

The function of the third blade of the switch 91 is to short-circuit or shunt either the switch 74 or the switch 75, depending on whether the switch is raised or lowered.

The switch 91 was raised to effect the raising operation of the snorkel tubes which means that the switch 74 was open at the beginning of the operation. On raising the switch 91, current flowed from the conductor 98 over the conductor 135 to the fourth blade of the switch, thence through the conductor 132 and the field 131 to the fifth blade. Similarly, it flowed from the fourth blade over the conductor 133 to the motor armature and back over the conductors 139 and 134 to the fifth blade of the switch, thence over the conductor 138, the switch 75 (which was then closed), the conductor 139a, the conductor 137 (the switch 74 being open at this instant), the center blade of the switch 91, the conductor 140, back to the negative line 99 and back to the generator. Had the switch 74 been closed, as it will be after the lug 73 has left engagement with it, there would have been a second path for the current over the conductor 141, the switch 74, the conductor 142, and the conductor 143 which is connected to the negative line 99. The operation of the motor, in addition to raising the snorkel tubes, rotates the disc 71 until the lug engages and opens the switch 75 as shown in Figure 1.

In the lowering operation, when the switch 91 is lowered, motor operation except for the center blade of said switch, could not be initiated because of the open position of the switch 75. But the center blade of the switch 91 is then engaged with the lower contact and current which has passed through motor 65 will flow over the conductor 138, the center switch blade, the conductor 137, the conductor 141, the switch 74 (which is then closed), the conductor 142 and the conductor 143 back to the negative line 99.

But the elevation of the switch 91 to its upper position brings the first and second blades into engagement with their upper contacts.

Since the invention contemplates the navigation of the equipped submarine with the snorkel tubes above the dips in the waves but below the crests thereof, water will intermittently flow into the trap tanks and it is disposed of by the pumps of which each tank is equipped with one. The pump serving the trap tank 50 operates independently of the rest of the apparatus—that is, it is not coordinated in function with the other elements of the apparatus, being controlled solely by its switch 56 actuated by the float 52. When water in the trap tank rises to a point where the float rod will trip the switch 56 into closed position, the motor 60 will be energized by current flowing from the conductor 98, over the conductor 145, to the motor 60, thence over the conductor 146, the switch 56, and the conductor 147 back to the negative line 99. When water in the tank has been removed to the point where the float 52 drops sufficiently, the rod 54 will effect opening of the switch 56.

The float 51 in the trap tank 41 operates in the same manner to control the motor 59, but its control switch 55 also controls valve opening and closing movement in the rest of the apparatus. When there is sufficient water in the trap tank 41 for the float to effect closing movement of the switch 55, the motor 59 will be set in operation by current flowing from the conductor 98 over the conductor 114 to the second blade of the switch 91, thence over the conductor 148 to the motor 59, thence over the conductors 149, 150 and 117 to the magnet 112, thence over the conductors 118, 119 and 151 to the switch 55, thence over the conductors 152 and 147 back to the negative line 99. It will be noted that this effects opening movement of the armature 111 of the relay which, when closed, effects opening movement of the valves 81 and 77. Thus when the motor switch is closed, the relay being open, then the valves 77 controlling communication between the trap tank 41 and the injector, and the valve 81 controlling communication between the ejector and the trap tank 50 are closed, but the valves 32 and 79 are open, so that the exhaust may be discharged into the injector and oxygen taken into the latter at the same time. But it is not necessary to trace out the circuits of these valves as that appears hereinbefore in connection with the submerging operation.

But it is proposed to charge the air tank during this near surface cruising and in the upper portion of the switch 91, the motor 43 is controlled, but its periods of operation are dependent on the closing of the switch 55. Assuming the switch to be closed due to the presence of water in the trank tank 41, current flows from the positive conductor 98 over the conductor 153 to the motor 43, thence over the conductor 154, across the switch 37', over the conductor 155 to the first blade of the switch 91, thence over the switch 96, the conductor 120, the conductor 151, the switch 55, the conductor 152, and the conductor 147 back to the negative line 99. Obviously, the switch 37' will function to control the operation of the motor because, being a serially connected switch, it will keep the motor circuit open except when the tank is below charging pressure.

A pilot light 156 is designed to be carried in the helmsman's cabin and this is likewise controlled by the switch 55, current flowing, when the said switch is closed, from the positive line 98 over the conductor 104, the conductor 122, the conductor 126, the conductor 128, the conductor 157, the light 156, the conductor 158, the switch 55 and conductors 152 and 147 back to the negative line.

Thus it will be seen, that when switch 55 is open, the engine will operate on air taken through the intake snorkel, the discharge being ejected through the exhaust snorkel. But if water be flowing into the tubes, the pumps 57 and 58 will be set in operation and the switch 55 will be closed and during periods when it is closed, the valves 32 and 79 will be open, permitting the use of the oxygenized exhaust in the engine, since closing of the switch 55 effects opening of the relay 111, thus closing the valves 81 and 77.

While it is believed that the air tank may be kept up to maximum pressure, by taking in air during the period of operation of the snorkel tubes, it may be necessary to charge the tank when the craft is on the surface of the water. Should such an exigency occur, a switch 159 may be employed connected across the conductors 121 and 155, as shown in dotted lines in Figure 1. This switch, when closed, will place the motor 43 directly across the line and permit its operation independent of the rest of the apparatus.

The function of the double-pole double-throw switch 92 is to permit, in case of emergency, the use of air from the air tank 34 when atmospheric air is not available, which may be the condition where the tops of the snorkel tubes are so close to the water that there may be very little air entering. In such a case, the switch 92 is thrown to lower position, which effects opening of the valve 81, placing the ejector in communication with the exhaust trap tank 50 and opening the valve 36 to place the air intake in communication with the injector. In this condition, the other valves, except the valves 47 and 49, will be closed, so that the engine may take in air from the air tank but discharge through the exhaust snorkel.

Current for opening the valve 81 will flow from the conductor 98, over the conductor 104, the conductor 108, the solenoid of the valve 81, the conductor 109, the upper blade of the switch 92, the conductor 125, the conductor 119, the conductor 151, the switch 55 and conductors 152 and 147, back to the negative line. At the same time, energizing current for the valve 36 will flow over the conductor 104, the conductor 122, the conductor 126, the conductor 128, the solenoid of the valve 36, the conductor 129, the lower blade of the switch 91, and across the cross-connector 124, and the conductors 125, etc., as specified in connection with the valve 81.

As hereinbefore described, the switch 93 is normally open, short-circuiting the switch to provide intermittent operation of the valve 36.

The metering valves 33 and 37 included in the discharges from the air tank and the oxygen tank are formed with conical seats with respect to which conical heads 160 are adjusted, these heads being carried by stems 161 threadingly engaged with the case 162 and having lock nuts 163 seating against the case to maintain the selected adjustment of the valve. By the provision of these valves, only a certain amount of air or a certain amount of oxygen can pass when the control valves connected to their respective tanks are opened.

The switch 92 is moved to its upper position by the spring 165 and to its lowered position by the solenoid 166, the solenoid being controlled by an element of the switch 37'. This latter switch comprises a rockable arm 167 connected, as above explained, with expansion member 38 and having one finger 168 sweeping the contacts 169 and 170, the latter being a dead contact and the former an arcuate segment connected with the conductor 155. The conductor 154 is connected to the finger 168. At the opposite end, arm 167 carries a contact finger 175 which sweeps contacts 171, 172, this latter being a dead contact and the former an arcuate segment connected by the conductor 173 with one terminal of the solenoid 166. The contact finger 175 is connected in on the conductor 153 by conductor 174.

In the operation of these switches, the chambered expansible member 38 rocks the arm 167, thus causing the contact fingers 168 and 175 to sweep their associated contacts. As the pressure in the tank approaches a maximum, the contact finger 168 moves off the segment 169 onto the dead contact 175. Under these conditions, the circuit on the motor 43 is broken and the pump 42 is stopped.

But the finger 175 is in engagement with the contact segment 171, so that the solenoid 166 is energized and the switch 92 pulled to the lowered position, which, as before explained, places the air tank in communication with the injector and the exhaust in communication with the trap tank 50, so that the engine runs on air from the air tank and the exhaust passes through the exhaust snorkel. As air is used from the tank and the pressure drops off, the chambered pressure member 38 rocks the arm 167 in the opposite direction than formerly, closing the circuit of the motor 43 and, when pressure in the tank is below the minimum, shifting the contact finger 175 onto the dead contact 172, thus breaking the circuit on the solenoid 166, when the spring 165 shifts the switch 92 to the upper position, so that, when the pump and motor of the trap tank 41 are operated, the engine exhaust is transferred to the injector and oxygen also transferred to the injector when the motor will utilize the oxygenized exhaust during periods when water is being removed from the trap tank 41, as previously explained.

The invention having been described, what is claimed as new and useful is:

1. In a submarine power plant, the combination with an internal combustion engine, of an injector having its discharge end in tubular communication with the intake of the engine, an oxygen tank in valved communication with the intake end of the injector, an air tank in valved communication with the intake end of the injector, valve controlled means between the engine exhaust and the intake end of the injector, the injector at its intake end having a valve controlling communication with outside air, all of said valves being yieldingly impelled to closed position, coordinated means for actuating the valves between the oxygen tank and the injector and between the exhaust and the injector to open position independently of the valve controlling communication with exterior air, said coordinated means being reversible to open the last said valve when the valve between the oxygen tank and injector and the valve between the exhaust and injector are closed, and an independent manual means for actuating the valve between the air tank and the injector to open position intermittently to augment with air the oxygenized exhaust gasses in the injector.

2. In a submarine power plant the combination with an internal combustion engine, of an injector having its discharge end in tubular communication with the engine intake, an oxygen supply tank in valved communication with the intake end of the injector, valve controlled means connecting the engine exhaust with the intake of the injector and said valve controlled means being provided with a valve controlling communication between the exhaust and outside air, the injector at its intake end having a valve controlling communication with outside air; all of said valves being yieldingly impelled to closed position, coordinated means for effecting opening movement of the valve between the oxygen tank and the injector, and the valve between the exhaust and the injector, independently of the valves controlling communication with outside air, said coordinated means being reversible to effect opening movement of the last said valves and to permit closing movement of the other valves, the injector being interiorly provided with spaced mixing fans.

3. In a submarine power plant the combination with an internal combustion engine, of an injector having its discharge end in tubular communication with the engine intake, an oxygen supply tank in valved communication with the intake end of the injector, valve controlled means connecting the engine exhaust with the intake of the injector and said valve controlled means being provided with a valve controlling communicating between the exhaust and the outside air, the injector at its intake end having a valve controlling communication with outside air; all of said valves being yieldingly impelled to closed position, coordinated means for effecting opening movement of the valve between the oxygen tank and the valve between the exhaust and the injector, independently of the valves controlling communication with outside air, said means being reversible to effect opening movement of the last said valves and to permit closing movement of the other valves, the injector being interiorly provided with spaced rotating mixing fans of progressively increased pitch from the intake end to the discharge end.

4. In a submarine power plant the combination with an internal combustion engine, of an elongated injector having its discharge end connected with the engine intake, an oxygen tank having a valve controlled connection with the intake end of the injector, an ejector of identical construction with the injector having its intake end in tubular communication with the exhaust, and having its discharge end in tubular communication with the intake of the injector with a control valve included therein, a valve controlling communication between the discharge end of the ejector and outside air, a valve controlling communication between the intake end of the injector and outside air, all of said valves being yieldingly impelled to closed position, and coordinated means for opening the valves between the oxygen tank and injector, and ejector and injector, independently of the valves controlling communication between the injector and outside air and the ejector and outside air, said means being reversible to actuate the two last said valves to open position while releasing the two first said valves to move to closed position.

5. In a submarine power plant the combination with an internal combustion engine, of an elongated injector having its discharge end connected with the engine intake, an oxygen tank having a valve controlled connection with the intake end of the injector, an ejector of identical construction with the injector having its intake end in tubular communication with the exhaust, and having its discharge end in tubular communication with the intake of the injector with a control valve included therein, a valve controlling communication between the discharge end of the ejector and outside air, a valve controlling communication between the intake end of the injector and outside air, all of said valves being yieldingly impelled to closed position, and coordinated means for opening the valves between the oxygen tank and injector, and ejector and injector, independently of the valves controlling communication between the injector and outside air and the ejector and outside air, said means being reversible to actuate the two last said valves to open position while releasing the two first said valves to move to closed position, and a compressed air tank in valved communication with the injector at its intake end, said valve being normally closed, but provided with a remote manual control for intermittent operation to augment the mixture in the oxygen tank, said coordinated means having means for rendering said valve inoperative by the remote control, except when the valves between the injector and outside air and ejector and outside air are closed.

6. In a submarine power plant the combination with an internal combustion engine, of an elongated injector having its discharge end connected with the engine intake, an oxygen tank having a valve controlled connection with the intake end of the injector, an ejector of identical construction with the injector having its intake end in tubular communication with the exhaust, and having its discharge end in tubular communication with the intake of the injector with a control valve included therein, a valve controlling communication between the discharge end of the ejector and outside air, a valve controlling communication between the intake end of the injector and outside air, all of said valves being yieldingly impelled to closed position, and coordinated means for opening the valves between the oxygen tank and injector, and ejector and injector, independently of the valves controlling communication between the injector and outside air and the ejector and outside air, said means being reversible to actuate the two last said valves to open position while releasing the two first said valves to move to closed position, and a compressed air tank in valved communication with the injector at its intake end, said valve being normally closed, but provided with a remote manual control for intermittent operation to augment the mixture in the oxygen tank, said coordinated means having means for rendering said valve inoperative by the remote control, except when the valve between the injector and outside air and ejector and outside air are closed, both the injector and ejector being interiorly provided with spaced rotating mixing fans.

7. In a submarine power plant the combination with an internal combustion engine, of an elongated injector having its discharge end connected with the engine intake, an oxygen tank having a valve controlled connection with the intake end of the injector, an ejector of identical construction with the injector having its intake end in tubular communication with the exhaust, and having its discharge end in tubular communication with the intake of the injector with a control valve included therein, a valve controlling communication between the discharge end of the ejector and outside air, a valve controlling communication between the intake end of the injector and outside air, all of said valves being yieldingly impelled to closed position, and coordinated means for opening the valves between the oxygen tank and injector, and ejector and injector, independently of the valves controlling communication between the injector and outside air and the ejector and outside air, said means being reversible to actuate the two last said valves to open position while releasing the two first said valves to move to closed position, and a compressed air tank in valved communication with the injector at its intake end, said valve being normally closed, but provided with a remote manual control for intermittent operation to augment the mixture in the oxygen tank, said coordinated means having means for rendering said valve inoperative by the remote control, except when the valve between the injector and outside air and ejector and outside air are closed, both the injector and ejector being provided with spaced rotating mixing fans of progressively increased pitch from their intake ends to their discharge ends.

8. In a submarine power plant the combination with an internal combustion engine, of an elongated injector having its discharge end connected with the engine intake, an oxygen tank having a valve controlled connection with the intake end of the injector, an ejector of identical construction with the injector having its intake end in tubular communication with the exhaust, and having its discharge end in tubular communication with the intake of the injector with a control valve included therein, a valve controlling communication between the discharge end of the ejector and outside air, a valve controlling communication between the intake end of the injector and outside air, all of said valves being yieldingly impelled to closed position, and coordinated means for opening the valves between the oxygen tank and injector, and ejector and injector, independently of the valves controlling communication between the injector and outside air and the ejector and outside air, said means being reversible to actuate the two last said valves to open position while releasing the two first said valves to move to closed position, and a compressed air tank in valved communication with the injector at its intake end, said valve being normally closed, but provided with a remote manual control for intermittent operation to augment the mixture in the oxygen tank, said coordinated means having means for rendering said valve inoperative by the remote control, except when the valve between the injector and outside air and ejector and outside air are closed, means for charging said air tank, said charging means including a motor driven pump, and tank pressure controlled means for controlling the operation of said motor, the latter also being controlled by said coordinated means so as to be operative only in the reversed position of said means.

9. In combination with a submarine having snorkel tubes, an internal combustion engine, an injector having its discharge end in communication with the engine intake and its intake end in valved communication with one of said snorkel tubes and an ejector having its intake end in communication with the engine exhaust and its discharge end in valved communication with the other snorkel tube, an oxygen tank in valved communication with the injector at its intake end, means for elevating and lowering said snorkel tubes, means for actuating said elevating and lowering means and imparting opening movement to said valves, and a dual position control for the last said means, the said control, when in one position, actuating the elevating and lowering means to raise the said snorkel tubes and simultaneously to open the valves between the injector and the one tube and the ejector and the other tube, the said control, when in the other position, actuating the said elevating and lowering means to lower the said snorkel tube actuating the valves between the injector and oxygen tank and ejector and injector to open position while releasing the valves between the ejector and injector and snorkel tubes to shift to closed position.

10. In combination with a submarine having snorkel tubes, an internal combustion engine, trap tanks with the upper ends of which the snorkel tubes are in communication, an injector having its discharge in communication with the engine intake, an oxygen tank in valved communication with the intake of the injector, the injector having its intake in valved communication with one of said trap tanks, an ejector having its intake in communication with the engine exhaust and its discharge in valved communication with the other of said trap tanks, a valve controlled conduit connecting the discharge end of the ejector with the intake of the injector, motor driven pumps in communication with the trap tanks at their lower ends, electrical actuating means for said pumps and valves, the said valves being yieldingly impelled to closed positions, and a dual position control for said electrical actuating means, the said control being movable to one position to open the valves between the injector and ejector and trap tanks and when moved to the other position, releasing the said valves and de-energizing the pump actuating means while opening the valves between the ejector and injector and oxygen tank and injector, the pumps being additionally controlled by float actuated switches.

11. In combination with a submarine having snorkel tubes, an internal combustion engine, trap tanks with the upper ends of which the snorkel tubes are in communication, an injector having its discharge in communication with the engine intake, an oxygen tank in valved communication with the intake of the injector, the injector having its intake in valved communication with one of said trap tanks, an ejector having its intake in communication with the engine exhaust and its discharge in valved communication with the other of said trap tanks, a valve controlled conduit connecting the discharge end of the ejector with the intake of the injector, motor driven pumps in communication with the trap tanks at their lower ends, electrical actuating means for said pumps and valves, the said valves being yieldingly impelled to closed positions, and a dual position control for said electrical actuating means, the said control being movable to one position to open the valves between the injector and ejector and trap tanks and when moved to the other position, releasing the said valves and de-energizing the pump actuating means while opening the valves between the ejector and injector and oxygen tank and injector, the pumps being additionally controlled by float actuated switches and means for elevating and lowering the snorkel tubes, the said means being controlled by the dual control to elevate the tubes when in one position and to lower the tubes when in the other position.

12. The structure of claim 11 combined with a compressed air tank in valved communication with the trap tank with which the injector is in similar communication, said valve being yieldingly impelled to closed position, and means to actuate said valve to open position when the dual control is in the position effecting the elevation of said snorkel tubes.

References Cited in the file of this patent

UNITED STATES PATENTS

| 740,864 | Jaubert | Oct. 6, 1908 |
| 881,803 | Jaubert | Mar. 10, 1908 |
| 883,240 | Sabathe | Mar. 31, 1908 |
| 970,210 | Fuller | Sept. 13, 1910 |
| 1,099,445 | Jaubert | June 9, 1914 |
| 1,310,253 | Shuman | July 15, 1919 |
| 1,359,513 | Leathers | Nov. 23, 1920 |
| 1,971,102 | Barraja-Frauenfelder et al. | Aug. 21, 1934 |
| 2,187,074 | Caproni | Jan. 16, 1940 |
| 2,456,213 | Pelic | Dec. 14, 1948 |

FOREIGN PATENTS

| 205,519 | Great Britain | Aug. 14, 1924 |
| 579,159 | Great Britain | July 25, 1946 |